United States Patent [19]
Mori

[11] 3,781,551
[45] Dec. 25, 1973

[54] ELECTRONIC SHUTTER-CONTROL CIRCUITS FOR CAMERAS

[75] Inventor: Chiharu Mori, Tokyo, Japan

[73] Assignee: Asahi Kogaku Kogyo Kabushiki Kaisha, Tokyo-to, Japan

[22] Filed: Feb. 9, 1972

[21] Appl. No.: 224,716

[30] Foreign Application Priority Data

Feb. 27, 1971 Japan ............................... 46/10095

[52] U.S. Cl. .......................... 250/214 P, 95/10 CT
[51] Int. Cl. ........................................... H01j 39/12
[58] Field of Search .................... 250/214 R, 214 D, 250/209; 307/311; 95/10 C, 10 CE, 10 CT

[56] References Cited

UNITED STATES PATENTS

| | | | |
|---|---|---|---|
| 3,625,124 | 12/1971 | Miyakawa | 95/10 CT |
| 3,393,604 | 7/1968 | Lundin | 95/10 CT |
| 3,641,890 | 2/1972 | Ono | 95/10 CT |
| 3,678,826 | 7/1972 | Mori | 95/10 CT |
| 3,679,905 | 7/1972 | Watanabe | 95/10 CT |
| 3,610,981 | 10/1971 | Gilligan | 250/214 P |
| 3,670,184 | 6/1972 | Idei | 250/214 P |
| 3,657,979 | 4/1972 | Nobusawa | 95/10 CT |

*Primary Examiner*—James W. Lawrence
*Assistant Examiner*—D. C. Nelms
*Attorney*—Harold D. Steinberg et al.

[57] ABSTRACT

An electronic shutter-control circuit for a camera. The circuit has a constant voltage source section as well as a photosensitive circuit section. The latter section receives light from the object to be photographed and is electrically connected with the constant voltage source section of the circuit to provide from the latter an output voltage whose value is proportional to the logarithmic value of the intensity of light input from the object received by the photosensitive circuit section. The shutter-control circuit also includes a constant current source circuit section, and between the latter section and the constant voltage source circuit section there are connected, in series with the latter sections, a plurality of variable resistors which are in series with each other. With this circuitry, electrical quantities corresponding to object brightness, aperture at the diaphragm, and film speed are logarithmically compressed and a computation is carried out with these logarithmically compressed electrical quantities, to determine an exposure time which is then logarithmically expanded and used for controlling the shutter.

9 Claims, 3 Drawing Figures

PATENTED DEC 25 1973 3,781,551

ELECTRONIC SHUTTER-CONTROL CIRCUITS FOR CAMERAS

BACKGROUND OF THE INVENTION

The present invention relates to cameras.

In particular, the present invention relates to cameras provided with electronic circuits for automatically determining the exposure time.

While electronic circuits of this latter type are indeed well known and widely used at the present time, the conventional circuits of this type suffer from certain drawbacks. Thus, conventional circuits have the drawback of lacking desired stability, and because of this lack of stability it is difficult to achieve accurate operation under all operating conditions. In addition, the conventional circuits are relatively complex and difficult to manufacture at low cost according to mass-production techniques. The lack of stability and uniformity in the operating characteristics of conventional circuits of this type comes from various sources. Thus, for example, voltage source variation creates lack of uniformity and stability. Also various electrical components in the circuit such as variable resistors, transistors, photosensitive elements, capacitors, and a switching circuit all have non-uniform operating characteristics which contribute to the lack of stability and uniformity in the operation of conventional circuits of this type.

SUMMARY OF THE INVENTION

It is accordingly a primary object of the present invention to provide electronic shutter-controlling circuitry which will avoid the above drawbacks.

In particular, it is an object of the present invention to provide a circuit of this type which will eliminate the drawback of voltage source variation so that the computing circuit of the invention will have very little dependency on the source voltage.

In addition it is an object of the present invention to provide an electronic shutter control circuit of the above type which will not be undesirably influenced by the variations or lack of uniformity in the operating characteristics of the components which make up the circuit.

Furthermore, it is an object of the present invention to provide an exceedingly simple circuit which can be economically manufactured according to mass-production techniques while achieving at the same time a high degree of stability and accuracy in the operation.

According to the invention, the electronic shutter-control circuit includes a constant voltage source circuit means and a photosensitive circuit means. The latter circuit means receives light from the object to be photographed and is electrically connected with the constant voltage source circuit means to provide from the latter an output voltage whose value is proportional to the logarithmic value of the intensity of light input from the object received by the photosensitive circuit means. A constant current source circuit means is also provided, and a plurality of variable resistor means are connected in series with each other and are electrically connected between the constant voltage source circuit means and the constant current source circuit means in series therewith.

BRIEF DESCRIPTION OF DRAWINGS

The invention is illustrated by way of example in the accompanying drawings which form part of this application and in which.

DESCRIPTION OF PREFERRED EMBODIMENTS

With the present invention there is provided an electronic shutter-control for a camera, this electronic shutter-control forming a computing circuit in which photographic variables, namely, object brightness B, diaphragm aperture A, and film speed value S are transformed into electrical quantities and logarithmically compressed. Then a computation is carried out with the corresponding values $B_V$, $A_V$ and $S_V$, according to the APEX system, so as to achieve a resulting value $T_V$ which is logarithmically expanded to obtain the exposure time T.

Figure 1:
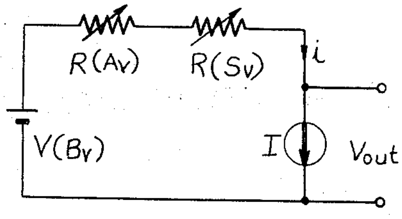
FIG. 1 is a simple circuit illustrating the principle of a computing circuit according to the present invention.

Referring now to FIG. 1, the principle of operation of a computing circuit according to the present invention is illustrated therein.

The circuit illustrated in FIG. 1 includes a voltage source $V(B_V)$. In series with the latter voltage source are the variable resistors $R(A_V)$ and $R(S_V)$. These latter variable resistors are adjusted either in proportion to or in inverse proportion to the values $A_V$ and $S_V$, respectively, according to the APEX system, of the diaphragm aperture A and film speed S, respectively.

The illustrated circuit also includes a constant current control section I.

The current value i of the constant current control section is established in such a way that the output voltage variation of the voltage source $V(B_V)$ corresponding to the variation of $B_V$ is equal to the algebraic sum of the voltage drop variations of the variable resistors $R(A_V)$ and $R(S_V)$ produced in correspondence with variations of the values $A_V$ and $S_V$, respectively. Thus, $V_{out}$ has a voltage value corresponding to the value $B_V + S_V - A_V$. In this way $V_{out}$ is obtained as an electrical quantity (a voltage value) corresponding to the value $T_V$ which is obtained as a result of a photographic linear computation with the variables $B_V$, $A_V$, and $S_V$ in an exceedingly simple manner. This circuitry of FIG. 1 represents the basic principle of the present invention.

Figure 2:
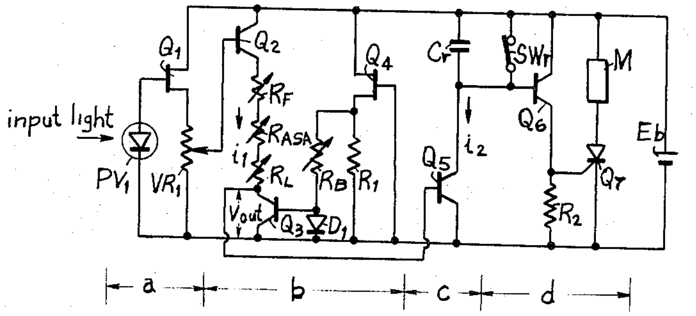
FIG. 2 is a wiring diagram of one embodiment of the invention as applied to a camera for forming an electronic shutter-control for the camera.

Referring now to FIG. 2, there is illustrated therein an example of a computing circuit according to the invention as applied to an electronic shutter-control circuit for a camera. For convenience of description, the circuit illustrated in FIG. 2 is divided into the fraction sections *a*, *b*, *c*, and *c*. The illustrated circuit includes a current source $E_b$. The section a is a light-measuring circuit section and is provided with a logarithmic compression characteristic. This section a includes a photovoltaic light-receiving element $PV_1$, such as a silicon photocell. As is well known, in response to light received by the light-receiving element $PV_1$, there will be a photoelectrically transformed output voltage which is proportional to the logarithmic value of the intensity of the light input from the object to be photographed, so that it is this latter output voltage which is obtained across the light-receiving element $PV_1$. This photoelectric transformation output voltage is applied as an input to a high input resistance type variable amplifier consisting of a field effect transistor $Q_1$ and a potientometer $VR_1$, in such a way that the photoelectric transformation output voltage matches with the logarithmic expansion characteristic of the transistor $Q_5$. The gain of the amplifier $Q_1$, $VR_1$ of the section a is established in such a way that the output terminal of the potentiometer $VR_1$ has a voltage output provided with a characteristic according to which the collector current value of transistor $Q_5$ (logarithmically expanded output current) is determined in proportion to the intensity of the light input from the object. In other words, this voltage output resulting from light received by the element $PV_1$ is of a value corresponding to the value $B_V$.

The circuit section *b* is that part of the circuit of FIG. 2 where the photographic computation according to the principle of the present invention is carried out. This section includes a transistor $Q_2$ which forms a constant voltage source circuit means, having a voltage determined in correspondence with the value $B_V$. The emitter electrode of transistor $Q_2$, which forms the output terminal of the illustrated emitter-follower circuit has electrically connected in series therewith a diaphragm or aperture value setting variable resistor $R_F$, a film speed setting variable resistor $R_{ASA}$, and a variable resistor $R_L$. The latter variable resistor is in turn connected in series with the collector electrode of a transistor $Q_3$ which forms a constant current source circuit means. Thus, with the circuit of the invention illustrated in FIG. 2, the several variable resistors $R_F$, $R_{ASA}$, and $R_L$ are connected in series with each other and are connected between the constant voltage source circuit means $Q_2$ and the constant current source circuit means $Q_3$, in series with the latter transistors.

A bias circuit means is electrically connected with the constant current source circuit means $Q_3$. This bias circuit means includes the diode $D_1$, a variable resistor $R_B$, a field effect transistor $Q_4$, and a resistor $R_1$. The bias circuit means establishes a proper value for the collector current of the transistor $Q_3$. The settings of the variable resistor $R_F$ determined in accordance with the diaphragm setting, and the variable resistor $R_{ASA}$ determined in accordance with the film speed setting, are determined in such a way that the values or electrical quantities intorduced into the circuit by way of these variable resistors are in proportion to or inverse proportion to the values $A_V$ and $S_V$ of the aperture setting and film speed, respectively, according to the APEX system. The collector current $i_1$ of the transistor $Q_3$ is established in such a way that the voltage drop across the variable resistors $R_F$, $R_{ASA}$, is in proportion to the value $A_V - S_V$, and this voltage drop variation corresponding to the variation of the value $A_V - S_V$ is equal to the voltage value variation determined in correspondence with the variation of the value $B_V$. Thus, the collector voltage $V_{out}$ of the transistor $Q_3$ is provided with an output value corresponding to the value $T_V$ obtained by photographic computation with the variables $B_V$, $A_V$ and $S_V$, which is to say the value $T_V$ will be equal to the value $B_V + S_V - A_V$.

When this circuit of FIG. 2 carries out the computation, the collector voltage $V_{out}$ of transistor $Q_3$ varies with variation of the settings or values of the variable resistors $R_F$ and $R_{ASA}$. It is readily understood from the collector voltage-current characteristic of a transistor that the collector current $i_1$ is securely influenced by the variation of the collector voltage $V_{out}$ and thus is maintained constant.

In the bias circuit, the source follower circuit consisting of the field effect transistor $Q_4$ and resistor $R_1$ acts as a stabilizing current source in order to keep constant the bias current of the transistor $Q_3$ which forms the constant current source circuit means, against variation of source voltage. Accordingly, with the circuitry of the invention it is possible to provide a computing circuit having very little source voltage dependency.

The variable resistor $R_L$ is provided so that, when the output voltage $V_{out}$ corresponding to the value $T_V$ is to be logarithmically expanded by the next stage transistor $Q_5$, the range of the logarithmically expanded current is established in accordance with the operating range or action level of the transistor $Q_5$. Thus, the value of the variable resistor $R_L$ is adjusted in such a way to properly establish the range of logarithmically expanded current corresponding to the value $T_V$.

The section C of the circuit of FIG. 2 is a logarithmic expansion and timing charge circuit section. The voltage output $V_{out}$ is applied as in input between the base and the emitter of the transistor $Q_5$. In accordance with the logarithmic expansion characteristic of transistor $Q_5$, there is provided an output current, the collector current of the transistor $Q_5$, $i_2$ which is proportional to the inverse logarithmic value of the output voltage $V_{out}$.

The section d of the circuit of FIG. 2 is a switching circuit section which is connected in parallel with the timing capacitor $C_T$. This switching circuit section includes a transistor $Q_6$, an SCR:$Q_7$, a resistor $R_2$, and an electromagnet M which actuates the shutter-closing structure so as to terminate an exposure. A normally closed timing switch $SW_T$ bridges the capacitor $C_T$, this switch $SW_T$ being mechanically coupled with the shutter-opening structure so that the switch $SW_T$ opens in a known way in synchronism with the opening of the shutter at the start of an exposure.

Thus, upon opening of the timing switch $SW_T$, the timing capacitor $C_T$ starts to accumulate a charge according to the charge which is provided by the output current $i_2$, and this charging of the capacitor $C_T$ continues through an interval whose mangitude is determined by the instant when the voltage across the timing capacitor $C_T$ reaches the threshold value determined by the switching circuit which then acts to control the electromagnet M so as to bring about closing of the shutter. By properly selecting the capacitance of the timing capacitor $C_T$ and the threshold value of the switching circuit so that the latter interval during which the capacitor is charged is related to the APEX system, the duration of time between shutter opening and shutter closing will equal the proper exposure time.

Figure 3:
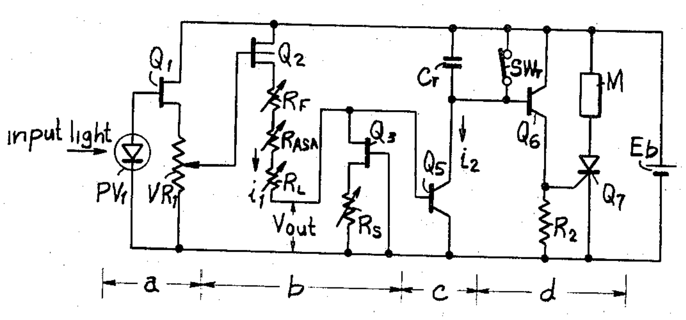
FIG. 3 is a wiring diagram of another embodiment of a computing circuit according to the present invention as applied to the electronic shutter-control structure for a camera.

FIG. 3 illustrates another embodiment of a computing circuit according to the invention. The sections *a,c* and *d*, of the embodiment of FIG. 3 are identical with the corresponding sections of FIG. 2, so that only the computing section *b* of FIG. 3 will be described since it is only in this section that there is a difference between the embodiments of FIG. 2 and 3. The computing section b of the circuit of FIG. 3 requires only two field effect transistors and is characterized in that this circuit section acting as a constant current control section can be very greatly simplified and has an exceedingly small dependency on source voltage. In order to obtain the current $i_1$ which flows through the variable resistors $R_F$ and $R_{ASA}$ which are set in accordance with the diaphragm setting and film speed, there is provided a grounded-gate source follower circuit consisting of the field effect transistor $Q_3$ and the variable resistor $R_S$. In this circuit, the constant current characteristic based on the drain voltage-current characteristic of the field effect transistor $Q_3$ is utilized and further, as a means for adjusting the value of the current $i_1$, the value or setting of the variable resistor $R_S$ is varied so as to vary in this way the self-bias voltage of the field effect transistor $Q_3$ in order to attain the desired result. The conditions for adjusting the circuit of FIG. 3 are completely the same as those of the embodiment of FIG. 2. The function of the field effect transistor $Q_2$ is completely the same as that of the transistor $Q_2$ of FIG. 2, irrespective of whether use is made of a field effect transistor or a bipolar type transistor. Thus, in the embodiment of FIG. 3 the constant voltage source circuit means is formed by the field effect transistor $Q_2$ while the constant current source circuit means is formed by the field effect transistor $Q_3$, and the several variable resistors $R_F$, $R_{ASA}$ and $R_L$ are connected in series with each other between these field effect transistors, in series with the latter.

As is apparent from the above description, the computer circuit according to the present invention is constituted essentially by an emitter follower circuit or a source follower circuit, so that this computing circuit of the invention is free from the influence of source voltage variation and can perform photographic computation in a highly stable and accurate manner. The exceedingly simple structure and the linear resistance characteristic of the diaphragm value, and the film speed value settings provided by the variable resistors are highly advantageous to achieve a high productivity by mass-production techniques.

With an electronic control shutter circuit having the computing circuit section according to the present invention, the influence of the non-uniformity of the resistance characteristics of the individual diaphragm value and film speed value variable resistors can be eliminated by properly adjusting the settings of the variable resistors $R_B$ or $R_S$, and thus the value of the current $i_1$ flowing through these variable resistors, bringing about in this way very readily a compensation to achieve the desired $A_V$ and $S_V$ transformation characteristics. In addition to the above lack of uniformity of the resistance characteristics of the variable resistors, there are influences resulting from lack of uniformity of the characteristics (directed current action levels) of the light measurement circuit section (the circuit section *a*) consisting of the light-receiving element, the field effect transistor, etc. and of the charging circuit section (the section *c*) having the logarithmically expanding means and the timing capacitor. In addition there is the influence of the lack of uniformity of the threshold values of the switching circuit section (the section *d*). All of these non-uniform influences are eliminated by properly adjusting the value or setting of the variable resistor $R_L$ so as to obtain in this way an exposure time T corresponding to the value $T_V$ as a result of the photographic computation. It is apparent, therefore, that with the above features of the invention a highly advantageous possibility for mass-production of the circuitry is achieved.

What is claimed is:

1. In an electronic shutter-control circuit for a camera, constant voltage source circuit means, photosensitive circuit means for receiving light from the object to be photographed, said photosensitive circuit means being electrically connected with said constant voltage source circuit means to provide an output voltage whose value is proportional to the logarithmic value of the intensity of light input from the object received by said photosensitive circuit means, constant current source circuit means, and a plurality of variable resistor means connected in series with each other and electrically connected between said constant voltage source circuit means and said constant current source circuit means in series therewith, said plurality of variable resistor means including variable resistors for introducing into the circuit vairable factors such as diaphragm aperature and film speed.

2. The combination of claim 1 and wherein said constant current source circuit means provides a given output, logarithmic expansion circuit means electrically connected to said constant current source circuit means for receiving said output therefrom, timing capacitor means electrically connected to said logarithmic expansion circuit means to be charged thereby, and switching circuit means electrically connected with said timing capacitor means to be controlled thereby for determining exposure time.

3. The combination of claim 1 and wherein said constant voltage source circuit means includes a photosensitive light-receiving element and a transistor having an emitter-follower circuit.

4. The combination of claim 1 and wherein said constant voltage source circuit means includes a photosensitive light-receiving element and a field effect transistor having a source follower circuit.

5. The combination of claim 1 and wherein a bias circuit means is electrically connected with said constant current source circuit means.

6. The combination of claim 1 and wherein said constant voltage source circuit means, said plurality of variable resistor means, and said constant current source circuit means are electrically connected one to the next in a closed-loop series.

7. The combination of claim 2 and wherein an additional variable resistor means is connected in series with said plurality of variable resistor means between said constant voltage source circuit means and said constant current source circuit means for providing a range of input voltage to said logarithmic expansion circuit means which conforms to the operating range of the latter.

8. The combination of claim 1 and wherein said photosensitive circuit means includes a photovoltaic light-receiving element and a variable amplifier of high input resistance consisting of a field effect transistor and a potentiometer connected in series across said photovoltaic light-receiving element, and said constant voltage source circuit means being connected between said field effect transis-tor and said potentiometer.

9. In an electronic shutter-control circuit for a camera, constant voltage source circuit means, photosensitive circuit means for receiving light from the object to be photographed, said photosensitive circuit means being electrically connected with said constant voltage source circuit means to provide an output voltage whose value is proportional to the logarithmic value of the intensity of light input from the object received by said photosensitive circuit means, constant current source circuit means, and a plurality of variable resistor means connected in series with each other and electrically connected between said constant voltage source circuit means and said constant current source circuit means in series therewith, said plurality of variable resistor means including variable resistors for introducing into the circuit variable factors such as diaphragm aperture and film speed, said constant current source circuit means including a field effect transistor having a grounded gate terminal and a source terminal, and a variable resistor connected between ground and said source terminal so that the drain current value of said field effect transistor is controlled by adjusting the latter variable resistor.

* * * * *